(12) United States Patent
Stoyanov

(10) Patent No.: US 10,311,117 B2
(45) Date of Patent: Jun. 4, 2019

(54) ENTITY LINKING TO QUERY TERMS ON ONLINE SOCIAL NETWORKS

(71) Applicant: Facebook, Inc., Menlo Park, CA (US)

(72) Inventor: Veselin S. Stoyanov, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 288 days.

(21) Appl. No.: 15/355,500

(22) Filed: Nov. 18, 2016

(65) Prior Publication Data

US 2018/0144051 A1 May 24, 2018

(51) Int. Cl.
| | | |
|---|---|---|
| *G06F 16/9535* | (2019.01) | |
| *H04L 29/08* | (2006.01) | |
| *G06F 16/901* | (2019.01) | |

(52) U.S. Cl.
CPC ...... *G06F 16/9535* (2019.01); *G06F 16/9024* (2019.01); *H04L 67/02* (2013.01); *H04L 67/306* (2013.01)

(58) Field of Classification Search
CPC ......... G06F 17/30867; G06F 17/30958; G06F 16/9024; G06F 16/9535; H04L 67/02; H04L 67/306
USPC ........................................................ 707/706
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |

(Continued)

*Primary Examiner* — Shahid A Alam
(74) *Attorney, Agent, or Firm* — Baker Botts L.LP.

(57) ABSTRACT

In one embodiment, a method includes identifying one or more entity candidates matching one or more n-grams in a character string, wherein each entity candidate corresponds to an entity associated with the online social network, each entity candidate being associated with one or more entity features and one or more type features, and wherein each entity candidate is of a particular entity type; calculating, for each entity candidate, a confidence score representing a likelihood that the entity candidate is intended to match the corresponding n-gram, wherein the confidence score is based on: an entity-score based on the one or more entity features and a type-score based on the one or more type features; and assigning an entity candidate to one or more of the n-grams based on the calculated confidence scores corresponding to the n-grams.

15 Claims, 8 Drawing Sheets

(56) References Cited

U.S. PATENT DOCUMENTS

| | | |
|---|---|---|
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Raj Aram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0270815 A1* | 11/2011 | Li .................. G06F 17/2785 707/706 |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Raj Aram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1* | 5/2013 | Lee .................. G06F 17/30392 707/751 |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |

(56) References Cited

U.S. PATENT DOCUMENTS

| | | |
|---|---|---|
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniayskii |

* cited by examiner

ENTITY LINKING TO QUERY TERMS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may associate text strings within search queries with one or more entities on the social-networking system. Recognizing when an entity is mentioned in text (e.g., in a search query) and linking that entity to at least a subset of the text (e.g., a n-gram) may be referred to as "entity linking." Many search queries references particular entities. As an example and not by way of limitation, in a search query that states "lady gaga concert," the entity referenced may be Lady Gaga, the American singer and songwriter. One goal of entity linking may be to infer the intent of a user when the user inputs a search query. As an example, in a post to the online social network, a user may write, "watching the Dubs game." The social-networking system may analyze this post and may determine that the n-gram "Dubs" refers to the unique social-graph entity "Golden State Warriors," an American basketball team. If other search queries by the same user or different users contain the n-gram "dubs," the social-networking system may determine that "dubs" refers to the same entity. Thus, the social-networking system may return to the user references to content objects related to the Golden State Warriors. Although this disclosure describes embodiments in the context of an online social network and social-networking systems, this disclosure contemplates embodiments in the context of any suitable online environment using any suitable computing system. For example, the embodiments described herein may be used in the context of an online database comprising a plurality of entities, such as Wikipedia or any other suitable entity database.

Entity linking may be technically challenging because words may be ambiguous. As an example and not by way of limitation, the text string "new york" could refer to New York City, the city in the United States, or it could refer to many different other entities, such as a city in the United Kingdom, the Yankees (a baseball team), the Mets (another baseball team), the Jets (an American football team), a movie, a song, and many other entities. The social-networking system may disambiguate terms by analyzing the context in which the terms were written. Continuing with the "new york" example, the text string "flights to new york" most likely refers to New York City, and "new york vs golden state" most likely refers to the New York Knicks (an American basketball team). To improve the accuracy and efficiency when parsing queries to perform entity linking, the social-networking system may, upon receiving a character string from a user, identify n-grams in the character string, then identify one or more entity candidates that match the n-grams. Each entity candidate may correspond to an entity associated with the online social network. Additionally, each entity candidate may have one or more entity features and one or more type features. The social-networking system may analyze the entity features and the type features, along with other information related to the text string (e.g., context features), and calculate a confidence score for each entity candidate. The confidence score may represent the likelihood that the entity candidate is the entity that the user intended to reference. The confidence score may be calculated using a type of statistical modeling called Segmental Conditional Random Field (CRF) modeling. The social-networking system may then assign one or more of the entity candidates to one or more of the n-grams based on their respective confidence scores.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
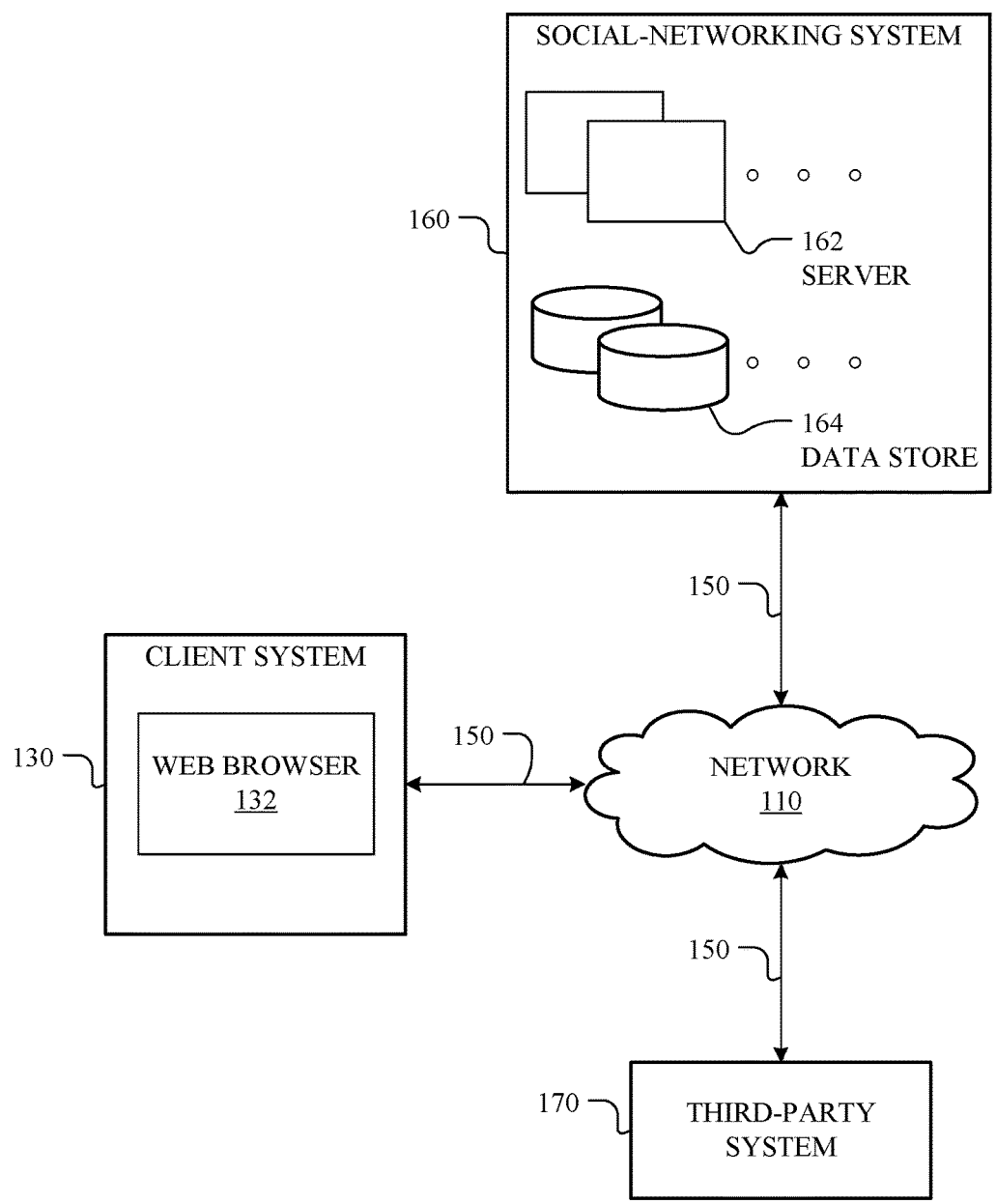
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
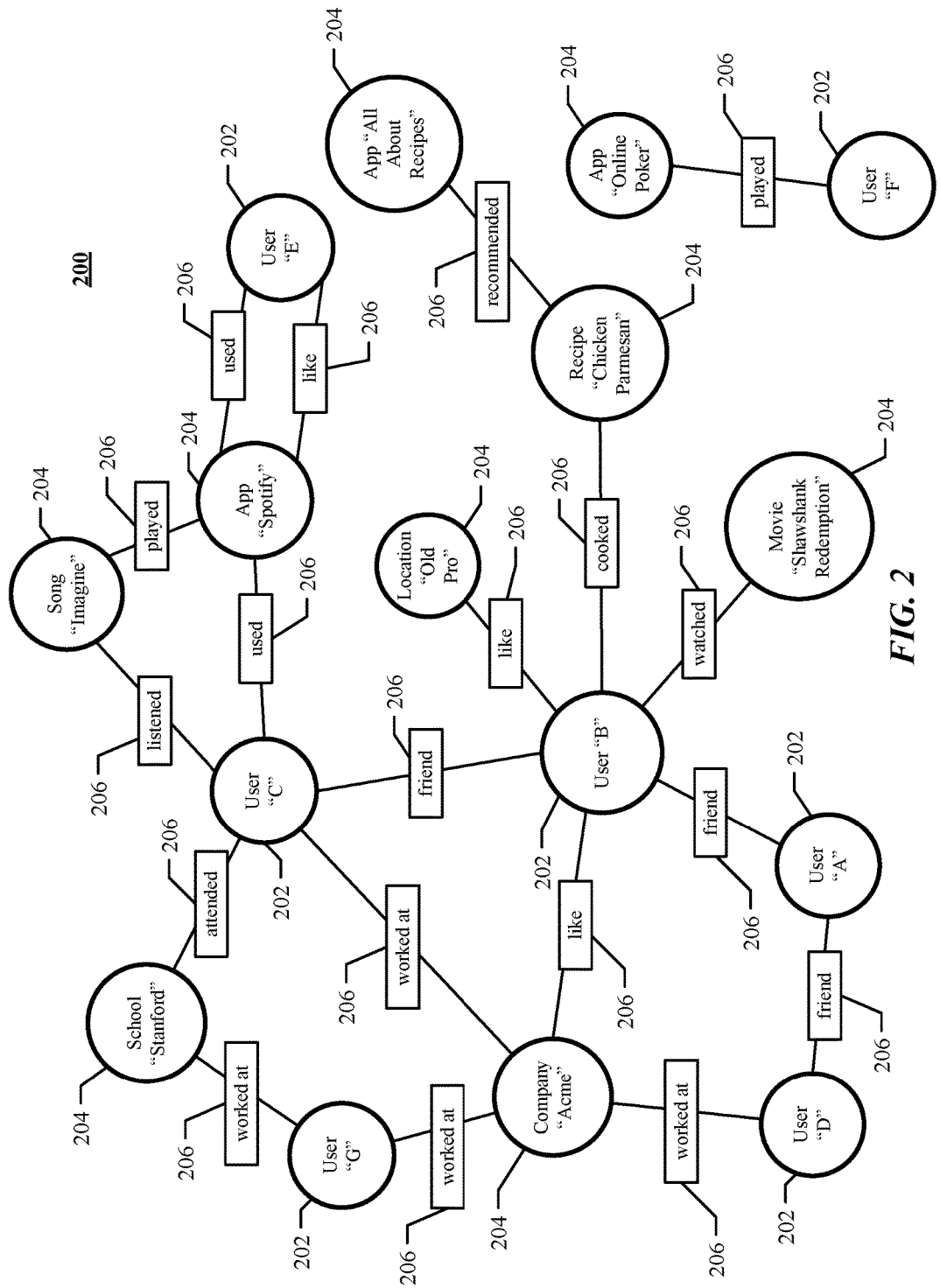
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node. More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Entity Linking on Online Social Networks

In particular embodiments, the social-networking system 160 may associate text strings within search queries with one or more entities on the social-networking system. Recognizing when an entity is mentioned in text (e.g., in a search query) and linking that entity to at least a subset of the text (e.g., a n-gram) may be referred to as "entity linking." Many search queries reference particular entities. As an example and not by way of limitation, in a search query that states "lady gaga concert," the entity referenced may be Lady Gaga, the American singer and songwriter. One goal of entity linking may be to infer the intent of a user when the user inputs a search query. As an example, in a post to the online social network, a user may write, "watching the Dubs game." The social-networking system 160 may analyze this post and may determine that the n-gram "Dubs" refers to the unique social-graph entity "Golden State Warriors," an American basketball team. If other search queries by the same user or different users contain the n-gram "dubs," the social-networking system may determine that "dubs" refers to the same entity and may link "dubs" to the Golden State Warriors. The social-networking system 160 may return to the querying user references to content objects related to the Golden State Warriors. Although this disclosure describes embodiments in the context of an online social network and social-networking systems, this disclosure contemplates embodiments in the context of any suitable online environment using any suitable computing system. For example, the embodiments described herein may be used in the context of an online database comprising a plurality of entities, such as Wikipedia or any other suitable entity database.

Entity linking may be technically challenging because words may be ambiguous. As an example and not by way of limitation, the text string "new york" could refer to New York City, the city in the United States, or it could refer to many different other entities, such as a city in the United Kingdom, the Yankees (a baseball team), the Mets (another baseball team), the Jets (an American football team), a movie, a song, and many other entities. The social-networking system 160 may disambiguate terms by analyzing the context in which the terms were written. Continuing with the "new york" example, the text string "flights to new york" most likely refers to New York City, and "new york vs golden state" most likely refers to the New York Knicks (an American basketball team). To improve the accuracy and efficiency when parsing queries to perform entity linking, the social-networking system 160 may, upon receiving a character string from a user, identify n-grams in the character string, then identify one or more entity candidates that match the n-grams. Each entity candidate may correspond to an entity associated with the online social network. Additionally, each entity candidate may have one or more entity features and one or more type features. The social-networking system 160 may analyze the entity features and the type features, along with other information related to the text string (e.g., context features), and calculate a confidence score for each entity candidate. The confidence score may represent the likelihood that the entity candidate is the entity that the user intended to reference. The confidence score may be calculated using a type of statistical modeling called Segmental Conditional Random Field (CRF) modeling. The social-networking system 160 may then assign one or more of the entity candidates to one or more of the n-grams based on their respective confidence scores. Although this disclosure describes linking particular terms to particular entities in a particular manner, this disclosure contemplates linking any suitable terms to any suitable entities in any suitable manner.

Identifying Entity Candidates

In particular embodiments, the social-networking system 160 may receive text input from a user of the online social network. The text input may be a search query, a post, a comment to a post or other content object, or any other suitable text input. The text input may be sent from a client system 130 associated with a user of the online social network. The text input may comprise a character string consisting of letters, numbers, symbols, or any other suitable input. As an example and not by way of limitation, the social-networking system 160 may receive text input from a first user in the form of a search query that states "new york city bus." The user may input this particular search query because the user is interested in seeing search results related to the bus system in New York City, such as, for example, the nearest bus stop along with a bus schedule. As another example and not by way of limitation, the social-networking system 160 may receive text input in the form of a status update that states "Riding the new york city bus!" The status update may be posted in conjunction with a photograph of the user as she rides a bus in New York City. As another example and not by way of limitation, a user may post a comment to a content object (e.g., a photo) posted to the online social network that states "Wow that looks just like a new york city bus." Although this disclosure describes receiving particular text inputs in a particular manner, this disclosure contemplates receiving any suitable text inputs in any suitable manner.

In particular embodiments, the social-networking system 160 may parse the character string to identify a plurality of n-grams. The social-networking system 160 may parse the character string and identify any number of n-grams using conventional methods. As an example and not by way of limitation, the social-networking system 160 may parse the character string "new york city bus" and identify the following n-grams: "new," "york," "city," "bus," "new york," "york city," "city bus," "new york city," "york city bus," or any other combination of n-grams. Although this disclosure describes parsing a character string in a particular manner, this disclosure contemplates parsing a character string in any suitable manner.

In particular embodiments, the social-networking system 160 may identify one or more entity candidates matching one or more of the n-grams. In particular embodiments, each entity candidate may correspond to an entity associated with the online social network. In particular embodiments, each entity candidate may be of a particular entity type. Entity types may include social-graph entities and keywords. Social-graph entities may be users of the online social network, businesses, celebrity pages, content pages, and the like. Keywords may be types of entities that correspond to particular terms or n-grams. In other words, keyword may be terms or n-grams that are not references to particular entities associated with the online social network. As an example and not by way of limitation, if a user inputs the text "laser unicorns," it is not immediately clear whether the user is intending to reference a particular entity that is associated with the text "laser unicorns" (e.g., a band with the name "laser unicorns"), or if the user is searching for content that is related to the n-grams "laser" and "unicorns" (e.g., a status update that has these two words in it). As an example and not by way of limitation, if a user updates his status to say, "everyone loves unicorns while playing laser tag," the words "laser" and "unicorns" may be intended as keyword rather than references to particular entities associated with the online social network. On the other hand, if a user updates her status to say "Laser Unicorns is my new favorite band!" the words "Laser Unicorns" would be an entity. Although this disclosure describes identifying entity candidates in a particular manner, this disclosure contemplates identifying entity candidates in any suitable manner.

In particular embodiments, to identify entity candidates for a particular text string, the social-networking system 160 may use one or more different sources. These sources may include the social graph 200 maintained by the social-networking system 160 (e.g., the social graph 200 may store entities that are associated with the online social network), third-party websites or sources, (e.g., WIKIPEDIA), or any other suitable source. As an example and not by way of limitation, in response to the text input "when is the Giants game?" the social-networking system 160 may identify several entities with the name "Giants" (e.g., the San Francisco GIANTS, a major league baseball team; the New York GIANTS, a team in the National Football League; GIANTS Software, a gaming company) by searching the social graph 200 for entities with the name Giants.

In particular embodiments, to more efficiently search the social graph 200, the social-networking system may build a reverse index from references to entities stored in a particular user's social network, retrieve all the entities that match a segment of the query or other text string, and keep the entities with the strongest social-graph affinity with respect to the querying user. A reference to an entity may be a name or number that uniquely identifies that entity. This name or number may then be stored in the reverse index for use by the social-networking-system 160. As an example and not by way of limitation, the text string "Kennedy" may refer to John F. Kennedy (with ID number 556), the Kennedy Center in Washington D.C. (with ID number 341), and another user, named Kennedy Martinez (with ID number 8972). These entity IDs may be stored in a reverse index for a particular user, Alex, because Alex may have interacted with these entities on the online social network. A user Alex may search "Kennedy" and the social-networking system 160 may access the entities referenced in the reverse index associated with Alex's social-graph information. Alex may be friends with Kennedy Martinez on the online social network, and may have recently visited the Kennedy Center to see a musical. He may also have liked a page associated with John F. Kennedy, or read an article about the former president. Each of these actions may correspond to different affinity coefficient between Alex and the different entities. Reading an article about John F. Kennedy may produce a lower affinity coefficient than checking in at the Kennedy Center, which may in turn produce a lower affinity coefficient than interacting with Kennedy Martinez on the online social network many times over several months. Based on the affinity coefficient and other contextual clues (e.g., location, current events, Wikipedia anchors), the social-networking system 160 may determine which Kennedy most likely links with Alex's search query (i.e., the Kennedy that Alex intended to reference with the search query). Although this disclosure describes using social graph information in a particular manner, this disclosure contemplates using social graph information in any suitable manner. More information about entity detection in a social graph is discussed in U.S. patent application Ser. No. 13/556,072, filed 23 Jul. 2012, which is incorporated by reference.

In particular embodiments, the social-networking system 160 may use a third-party website or source, such as WIKIPEDIA, to identify entity candidates. As an example and not by way of limitation, in response to the text input "london," the social-networking system 160 may query WIKIPEDIA to generate one or more entity candidates that are associated with the n-gram "london." Such candidates may include the city in the United Kingdom, the town in Ontario, Canada, London Records (a company in the United Kingdom), or Jack London (a famous author). Each of these entity candidates may also be entities on the online social network. As such, they may each have a profile page and may be represented by a node in the social graph 200. Although this disclosure describes using a third-party website or source to identify entity candidates in a particular manner, this disclosure contemplates using a third-party website or source to identify entity candidates in any suitable manner.

Figure 3:
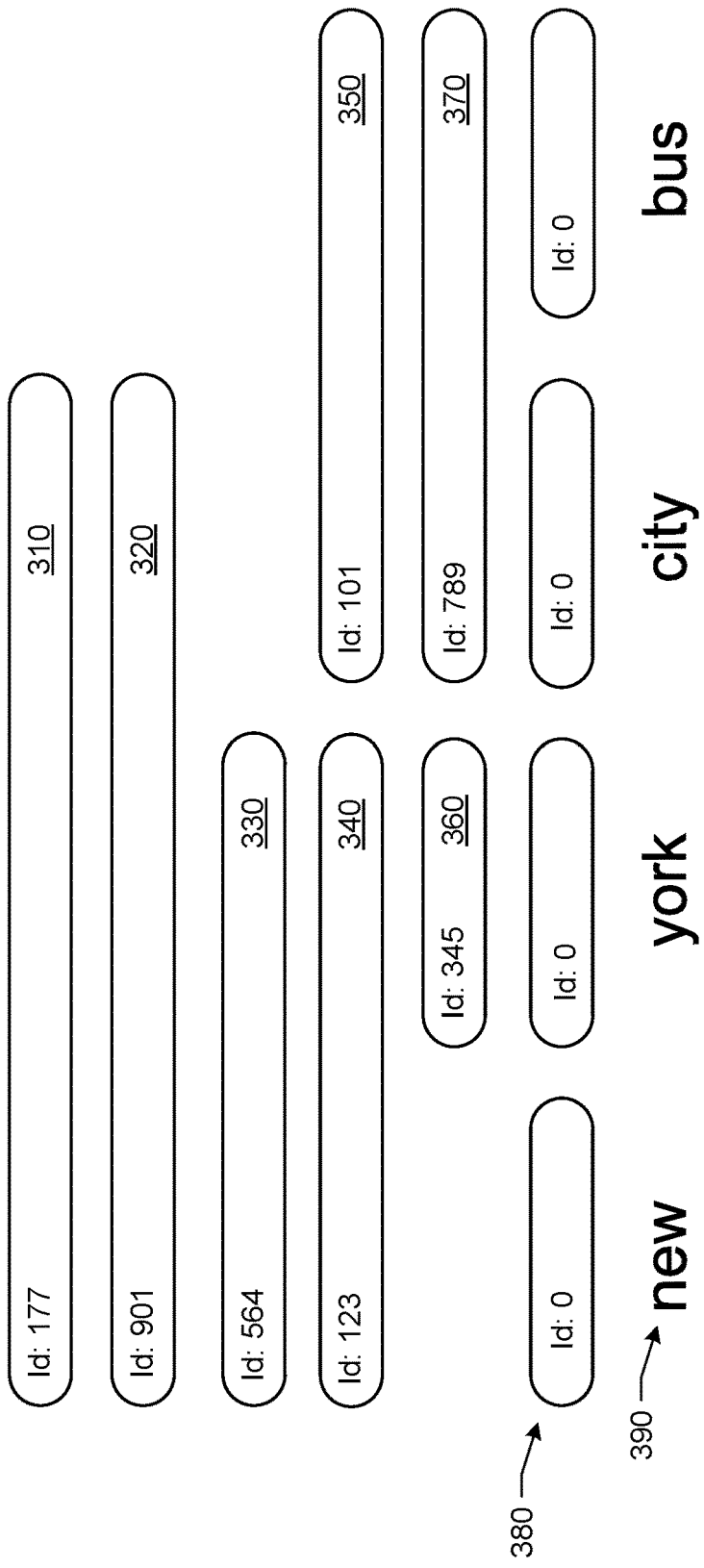
FIG. 3 illustrates an example representation of an entity linking system.

FIG. 3 illustrates an example representation of an entity linking system wherein multiple entity candidates 310-380 have been identified. In the representation, each entity candidate 310-380 may correspond to the n-grams directly below the entity candidate. The social-networking system 160 may have received the character string "new york city bus" and identified eleven entity candidates 310-380 to potentially link to the n-grams in the search query. These entity candidates may each be represented by a node in the social graph maintained by the social-networking system 160. Entity candidate 310 may correspond to the n-gram "new york city," whose identifier is 177. Identifier 177 may correspond to the entity New York City, the most populous city in the United States. New York City may have an official profile page on the online social network. As an example and not by way of limitation, if a user searches "new york city" and selects a reference that corresponds to New York City with identifier of 177, the social-networking system 160 may send to the user's client system 130 the official profile page associated with New York City. Entity candidate 320 may correspond to New York City, a professional soccer team that competes in the Eastern Conference of the Major League Soccer. The New York City soccer team may also have a profile page on the online social network, which fans may visit via the online social network. Entity candidate 330 may correspond to New York, a 2009 Bollywood film, which may also have its own profile page on the online social network. The other entity candidates 340-370 may similarly correspond to entities associated with the online social network and may similarly have their own profile pages. Entity candidates 380 may each correspond to the individual keywords "new," "york," "city," and "bus," respectively. As such, they may receive a null or "0" for their identification number. Keywords may be n-grams that are not associated with entities on the online social network, but may still be considered a type of entity, and nevertheless be entered in a post or search query. As an example and not by way of limitation, "bus" may be a keyword that refers to a mode of transportation. As another example and not by way of limitation, in the character string, "new york vs golden state," the n-gram "vs" may be a keyword that does not correspond to any entity on the online social network, but rather is a keyword that may refer to the fact that "new york" is competing against "golden state." These may be referred to as keyword entity candidates, and they may be given an ID of 0 by the social-networking system 160. Although this disclosure describes identifying entity candidates in a particular manner, this disclosure contemplates identifying entity candidates in any suitable manner.

In particular embodiments, each entity that is associated with the online social network may have a unique identification number, which may be referred to as a canonical ID. The canonical ID may be the identifier that corresponds to an official profile page of that entity. As an example and not by way of limitation, The Beatles (a musical group) may have many fan pages on the online social network. However, The Beatles may have only one official profile page on the online social network. This profile page may be associated with a unique identifier, and because it corresponds to the official profile page of The Beatles, this unique identifier may be referred to as the canonical ID for The Beatles. In particular embodiments, canonical IDs may be stored in an entity forward index maintained by the social-networking system 160. The entity forward index may store information for each entity, such as the entity's canonical ID, the number of in-links to that entity on third-party websites or sources (e.g., WIKIPEDIA), and social-networking information related to the entity (e.g., number of likes, shares, mentions in user posts, etc.). As another example and not by way of limitation, the social-networking system 160 may maintain an entity forward index that stores the canonical ID for New York City, which may be ID 177. The social-networking system may identify New York City (ID 177) as an entity candidate for the n-gram "new york city bus." More information on canonical entities and canonical identification numbers may be found in U.S. patent application Ser. No. 15/192,780, which is incorporated herein by reference. Although this disclosure describes canonical IDs in a particular manner, this disclosure contemplates canonical IDs in any suitable manner.

Entity Features and Type Features

In particular embodiments, each entity candidate may be associated with one or more entity features. Entity features may be used by the social-networking system 160 to rank the entity candidates so that the social-networking system 160 may determine which entity candidate most likely links to the inputted character string. The entity features may be used to calculate the probability that an entity candidate is the intended entity referenced by a given text string. In particular embodiments, the entity features may be signals of the overall popularity of an entity candidate. Examples of such entity features may include the number of likes a page has, the number of in-links a particular term has on WIKIPEDIA, the number of times an entity or content related to the entity has been shared, whether the entity is trending, the number of social graph edges a node corresponding to a particular entity has, or any other suitable metric. WIKIPEDIA in-links may be hyperlinks on WIKIPEDIA pages that lead to other WIKIPEDIA pages. As an example and not by way of limitation, the BEATLES WIKIPEDIA page may say that the BEATLES performed in London, with an in-link (e.g., hyperlink) of the text "London" to the WIKIPEDIA page for the city of London in the United Kingdom. By counting WIKIPEDIA in-links for each entity candidate, the online-social networking system 160 may calculate the probability that a particular entity links to a particular search query. For example, 95% of all "london" anchors may link to the city in the United Kingdom, 3% may link to London, Ontario, Canada, 1% to London Records, and 1% to Jack London. These percentages be used as a signal to determine how likely it is that a particular entity candidate links with a given search query. Because London, the city in the United Kingdom, has many more in-links than Jack London, it is likely that a user who enters the text string "london" intends to locate references to London, the city in the United Kingdom, and not Jack London. As an example of how the number of edges a node corresponding to a particular entity relates to entity features, a user may enter the search query "Stanford." The social-networking system 160 may identify two entities associated with this search query: Stanford University (with ID 388), and Stanford, California (with ID 912), a town in Northern California. Each of these entities may be represented by nodes on social graph 200 and may be connected to one or more nodes by one or more edges. The node corresponding to Stanford University may have 5,000 edges connected to it, each edge coming from a different node on social graph 200. The node corresponding to Stanford, Calif. may only have 15 edges connected to it. Because the node corresponding to Stanford University has more edges than Stanford, Calif., this entity feature may raise the confidence score for Stanford University in relation to Stanford, Calif. Although this disclosure describes entity features in a particular manner, this disclosure contemplates entity features in any suitable manner.

In particular embodiments, the entity features may comprise one or more context features associated with the entity candidate. The context features may be based on a similarity of an embedding of the n-gram and an embedding of the entity candidate. The social-networking system 160 may identify and use context features to measure the compatibility of the inputted text outside of the mention (e.g., search query, status update) with each entity candidate. As an example and not by way of limitation, for the inputted text "statue of liberty," the social-networking system 160 may identify the following entity candidates: "Statue of Liberty," "Statue of David," and "Liberty Bell." The entity candidate "Statue of Liberty" may be the obvious choice here, but the social-networking system 160 may still need to determine the ranking of "Statue of David" and "Liberty Bell" (e.g., determining which of these two entity candidates has a higher probability that it was the entity the user intended to reference). The social-networking system 160 may map the text input "statue of liberty" to a vector of real numbers in an n-dimensional vector space (e.g., using a word2vec paradigm), and may also map the entity candidates "Statue of David" and "Liberty Bell" similarly. The vectors may represent how the mapped text appears in the context of other text across a large corpus of documents. The social-networking system 160 may compare the vectors for "statue of liberty" to the vectors for "Statue of David" and "Liberty Bell." If the cosine similarity between the vectors for "statue of liberty" and "Liberty Bell" is greater than the cosine similarity between the vectors for "statue of liberty" and "Statue of David," the social-networking system 160 may rank the entity candidate "Liberty Bell" higher than the entity candidate "Statue of David." The reason that the vectors for "statue of liberty" and "Liberty Bell" are more similar than the vectors for "statue of liberty" and "Statue of David" may be that the text "statue of liberty" appears more often with "liberty bell" than with "statue of david." In particular embodiments, the social-networking system 160 may use topic2vec word embeddings, which may contain embeddings for words and entities together. Topic2vec may use the word2vec paradigm, but with a rule-based topic tagger. The rule-based topic tagger may extract the identification numbers of the entity candidates and may compute embeddings for the identification numbers in addition to the word embeddings. Given an entity identification number and the n-grams that make up the entity candidate, the social-networking system 160 may compute the similarity between the n-grams and the identification number. This may enable the social-networking system 160 to rank entity candidates based on context features.

In particular embodiments, each entity candidate may be associated with one or more type features. Determining type features associated with entity candidates may be important to the social-networking 160 because it may be helpful to distinguish between entity candidates of different types. As discussed above, a given entity candidate may be a social-networking entity (e.g., user, celebrity page, business, group, organization), or may be a keyword. In particular embodiments, the type features may comprise one or more n-grams comprised in the entity candidate, one or more n-grams surrounding the entity candidate in the search query, and contextual signals. Contextual signals may be how the text that makes up the entity candidate is used outside of the online social network. Examples of contextual signals may include whether the text appears as a proper noun in most instances, whether the text appears in a dictionary, among others. The type features may provide clues as to whether the entity candidate is a social-graph entity or a keyword. As an example and not by way of limitation, in the text "city bus," the n-gram "city" may be a keyword (e.g., "city" in the ordinary sense of the word) or may refer to a social-graph entity (e.g., "city" may refer to "The City" as in New York City). The social-networking system 160 may analyze the type features associated with "city" (e.g., that it has an ordinary dictionary definition, it is usually referred to as a regular noun) and determine that "city" is a keyword. In particular embodiments, the type features may include word2vec, because word2vec may be suitable for determining whether a given word is a common noun or a proper noun. Although this disclosure describes determining and using type features in a particular manner, this disclosure contemplates determining and using type features in any suitable manner.

Figure 4:
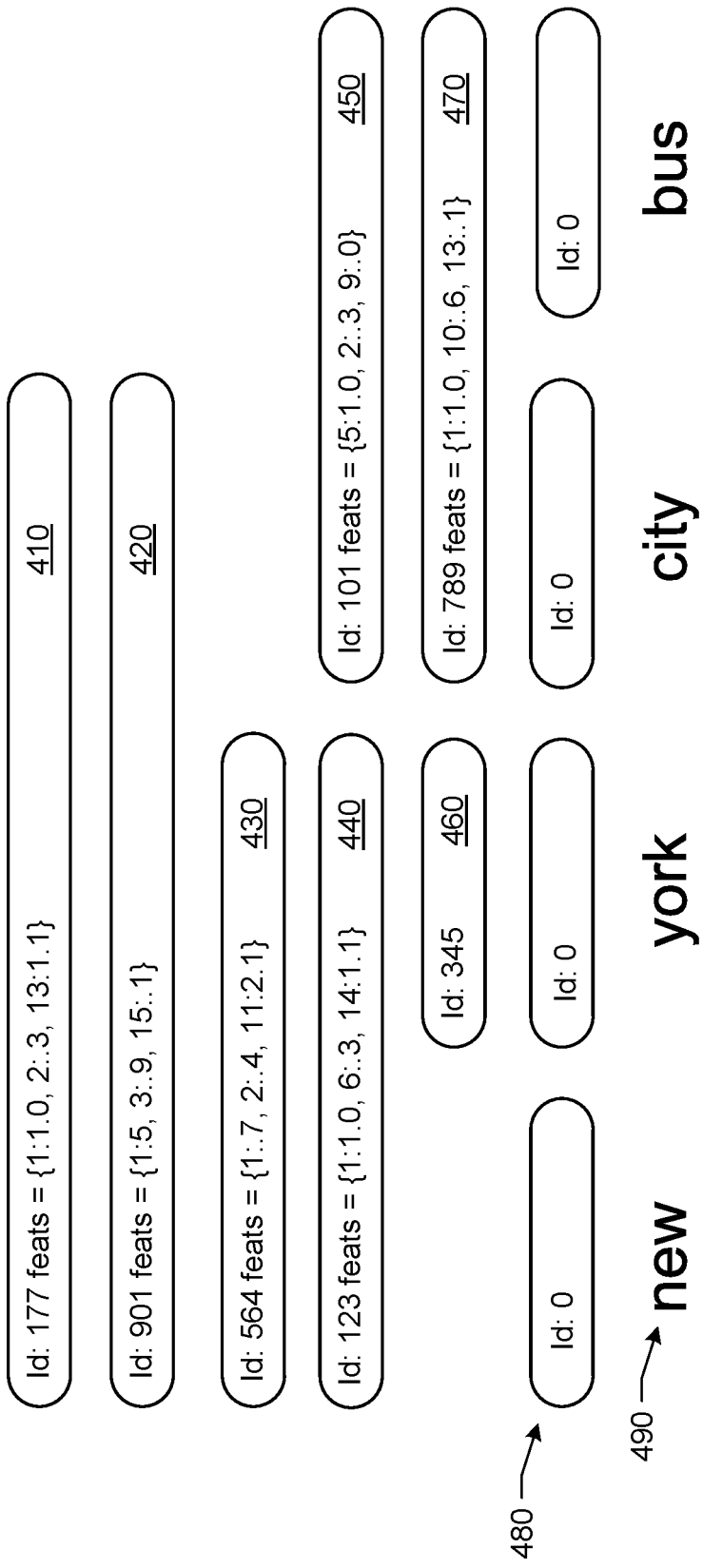
FIG. 4 illustrates another example representation of an entity linking system.

FIG. 4 illustrates another example representation of an entity linking system wherein multiple entity candidates 410-480 have been identified and given features with entity-scores and type-scores. The entity scores and type scores may be included in the bracketed set of numbers following the text "feats =" in entity candidates 410-480. The entity-score may represent a likelihood that the entity candidate matches the corresponding n-gram (e.g., the inputted text). The type-score may represent a likelihood that the entity candidate is of the entity type that the user intends to reference (e.g., a search for "cesar chavez" would return a celebrity page name and not a street name, assuming the user intended to reference the person Cesar Chavez). For simplicity's sake, entity-scores and type-scores may also be referred to as feature scores. Although entity candidates 460 and 480 do not affirmatively display feature scores, they may nonetheless have feature scores that are not displayed in FIG. 4. The feature scores may not all be listed or calculated for each entity candidate. As an example and not by way of limitation, entity candidate 410 may have values for features 1, 2, and 13, which may correspond to a normalized number of likes, a normalized number of in-links from a third-party website, and a normalized cosine similarity for word embeddings of the text and entity candidates, respectively. The other entity candidates 420-480 may have feature scores for the same or different features. In particular embodiments, the social-networking system 160 may assign different weights to different feature scores. As an example and not by way of limitation, the number of likes an entity candidate has may be weighted more heavily than the number of in-links the entity candidate has on a third-party website. Thus, the feature score for the number of likes a particular entity candidate has may be assigned a greater weighting factor than the features score for the number of WIKIPEDIA in-links the particular entity candidate has. The weighting factors may be different for each entity candidate, and this may be why different feature scores are displayed for different entity candidates. In particular embodiments, the social-networking system 160 may calculate all feature scores for all entity candidates, but only consider the three (or some other suitable number) highest feature scores. Although this disclosure describes determining feature scores in a particular manner, this disclosure contemplates determining feature scores in any suitable manner.

Calculating Confidence Scores Using Segmental CRF

In particular embodiments, the social-networking system 160 may calculate, for each entity candidate, a confidence score that represents the likelihood that the entity candidate is the entity the user intends to reference with the inputted text. As an example of user intent and not by way of limitation, if a user inputs the text "Let's Go Dubs!", he may be intending to reference the Golden State Warriors. Using the methods described herein, the social-networking system 160 may correctly link "Dubs" to the Golden State Warriors. In particular embodiments, the confidence score may be based on the entity-scores and type-scores for the entity candidates, which are discussed above with reference to FIG. 4. In particular embodiments, the social-networking system 160 may calculate the confidence score using a type of statistical modeling called segmental conditional random field (CRF). CRF statistical modeling may enable the social-networking system 160 to assign values to variables, taking into consideration both the variable in question and the surrounding variables. Other forms of statistical modeling may only consider the individual variables, but not the surrounding variables. As an example and not by way of limitation, a program application may attempt to sort or categorize search queries in order to provide better search results. The program application may attempt to link search queries to the appropriate entity. For a search query that states "businessman," a traditional search engine may simply look at the text of the query and search for entities and results that relate to "businessman." Such a program may link to an entity such as Donald Trump or Warren Buffet, who are both famous businessmen. However, an application that uses a CRF model may consider not only the text in the "businessman" search query, but also surrounding searches by the user or other users. For example, the user may have previously entered the following search queries: "I tighten my belt before I beg for help," "I never ask for nothing I don't demand of myself" and "99 problems," which are all lyrics by the rapper Jay-Z. An application that uses a CRF model may consider these other search queries when analyzing and searching for results matching the search query "businessman." The application which uses a CRF model may link to an entity associated with Jay-Z because of his lyric "I'm not a businessman; I'm a business, man," or the application may link to the song from which the lyric originates: "Diamonds from Sierra Leone." Although this disclosure describes linking to entities in a particular manner, this disclosure contemplates linking to entities in any suitable manner.

As another an example of how a CRF statistical model may function and not by way of limitation, a program application may attempt to sort or categorize photographs according to the time of day the photographs were taken. Other forms of statistical modeling may categorize a photograph of breakfast cereal as a morning photo, and a photograph of a sunset as an evening photo. However, some people like to eat breakfast cereal in the evening as a snack, and a sunset photograph may just as easily be a sunrise photograph. By only considering the data in each individual photograph, it is impossible to determine whether a photograph of breakfast cereal was taken in the morning or evening. A program that uses CRF may consider not only the data in the photograph, but also the data in surrounding photographs. Thus, CRF may consider not only the photograph of the breakfast cereal, but also other photographs that may be related, such as a photograph of an alarm clock, or a photograph of orange juice, or of a cup of coffee. These additional photographs may enable the program to more accurately categorize the photograph of breakfast cereal as a morning photograph. Applying CRF to entity linking by the social-networking system 160 may allow the social-networking system 160 to consider not only the text in the given text input (e.g., a search query, a status update), but also the text in other, related text inputs. Two text inputs may be related if they share at least some quality. As an example and not by way of limitation, two text inputs entered by the same user may be related because they share a user, two text inputs entered within five minutes of each other may be related because they where both entered at the same time. Segmental CRF may not only take into account the surrounding variables (e.g., related search queries), but also other observations and features that may help decode a signal. As an example and not by way of limitation, segmental CRF may take into consideration the entity features and type features that are discussed herein, such as social networking data associated with the entity candidates. These observations and features may be used in assigning a probability to the variable in question, as discussed below. Although this disclosure describes calculating a confidence score in a particular manner, this disclosure contemplates calculating a confidence score in any suitable manner.

In particular embodiments, the social-networking system 160 may calculate the confidence score of a particular entity candidate by implementing the following equation:

$$s(e_k) = \Sigma_i w_i^e f_i^e(e_k, \text{text}) + \Sigma_j g_j^t f_j^t(\text{type}(e_k), \text{text}),$$

wherein $e_k$ is the particular entity candidate that has i entity features and j type features, $f_i^e$ is a particular entity feature associated with the particular entity candidate $e_k$, $w_i^e$ is an entity weight assigned to the particular entity feature $f_i^e$, $f_j^t$ is a particular type feature associated with the particular entity candidate $e_k$; and $g_j^t$ is a type weight assigned to the particular type feature $f_j^t$. By way of explanation, the first summation is a sum of the product of the particular entity feature and its corresponding weight over all i entity features, and the second summation is a sum of the product of the particular type feature and its corresponding weight over all j type features. Generally speaking, the first half of the above equation applies to the entity features and the entity-scores for the entity candidates, and the second half of the equation applies to the type features and the type-scores for the entity candidates. Although this disclosure describes calculating a confidence score in a particular manner, this disclosure contemplates calculating a confidence score in any suitable manner.

Figure 5:
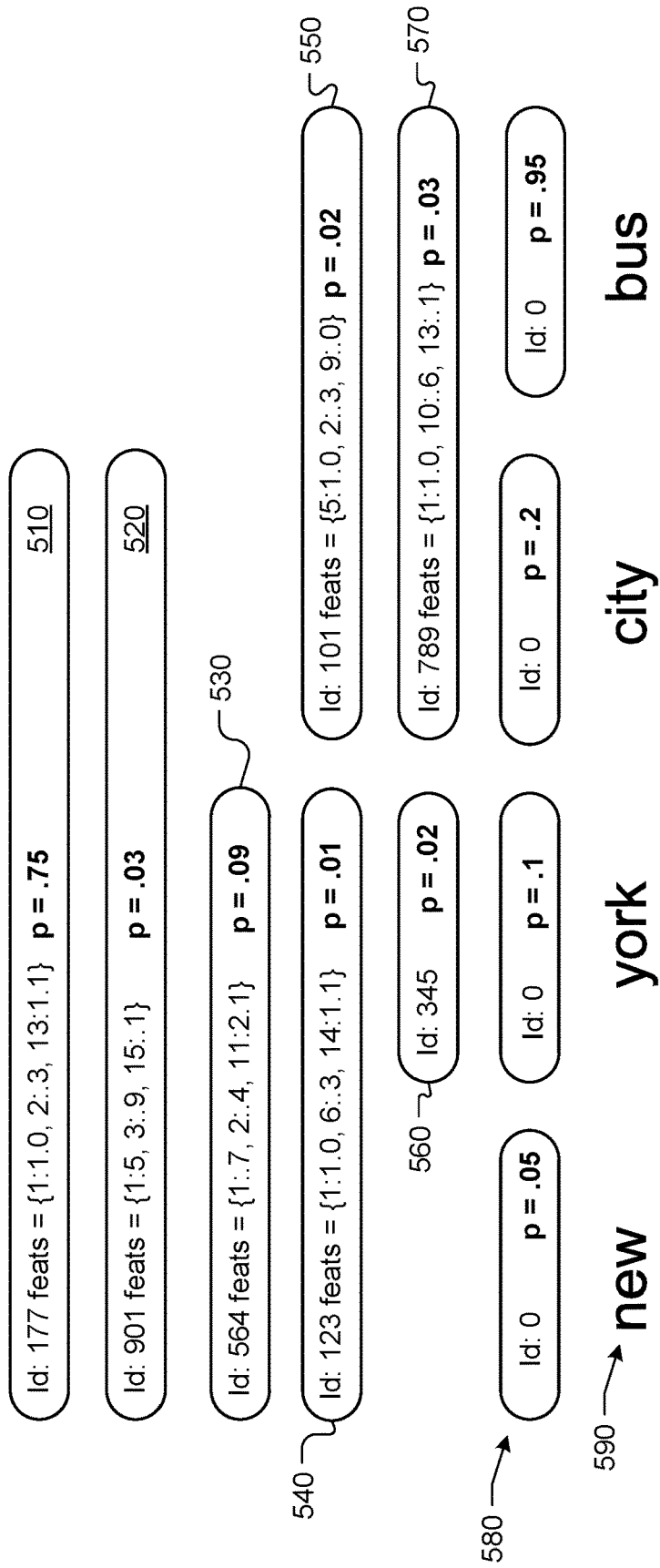
FIG. 5 illustrates another example representation of an entity linking system.

The above equation may return the probability that a particular entity candidate is the intended reference for a given n-gram. As an example of the above equation an not by way of limitation, the social-networking system 160 may identify two entity candidates 410 and 420 for the text "new york city bus." Both entity candidates may be New York City. Entity candidate 410 with ID 177 may represent the city New York City in the state of New York. Entity candidate 420 with ID 901 may represent the USS New York City, the only ship of the United States Navy to be named after New York City, N.Y. The social-networking system 160 may apply the above equation to calculate a confidence score for entity candidates 410 and 420 and determine that the confidence score for entity candidate with ID 177 is 0.75, which is illustrated in FIG. 5 with reference to entity candidate 510. The social-networking system 160 may apply the same equation to the entity candidate with ID 901 and determine that its confidence score is 0.03. The confidence score for entity candidate with ID 177 may be much higher than the confidence score for entity candidate with ID 901 because, for example, New York City may have more in-links on WIKIPEDIA, more interaction on the online social network (e.g., likes, tags, shares), and may have a closer connection to the querying user (e.g., a higher affinity coefficient) than the USS New York City. Although this disclosure describes calculating a confidence score in a particular manner, this disclosure contemplates calculating a confidence score in any suitable manner.

In particular embodiments, a confidence score for a first entity candidate may be based at least in part by the confidence score for a second entity candidate originating from the same search query. As an example and not by way of limitation, the search query "new york city bus," may have three entity candidates: (1) New York, (2) New York City, and (3) city bus. Because the entity candidate New York City receives a high confidence score (because it is likely that this is an entity intended by the search query), the entity candidate city bus may receive a lower confidence score than it would receive if the entire search query were "city bus." The two entity candidates New York City and city bus may conflict because they both share the n-gram "city." As another example and not by way of limitation, the search query "England city bus" may have three entity candidates: (1) England, (2) England City, and (3) city bus. Because the entity candidate England City is not likely to receive a high confidence score, the entity candidate city bus may receive a higher confidence score than it would have if it were entered along with "New York City." Here, it is more likely that England is an intended entity because England City may not be a popular entity. Thus, the two entity candidates England and city bus do not conflict, so city bus may receive a higher confidence score. Although this disclosure describes calculating a confidence score in a particular manner, this disclosure contemplates calculating a confidences score in any suitable manner.

In particular embodiments, the social-networking system 160 may calculate the probability that all identified entity candidates will be assigned to the plurality of n-grams. This probability may be expressed as is $$p(y) = \frac{e^{\Sigma e_i \in y \, s(e_i)}}{z},$$

wherein $e_i$ is a particular entity candidate, y is a set of all possible assignments, and z is a normalizing constant that represents a sum of all possible assignments. The numerator portion of this equation may be a typical log-linear model. It may take each entity candidate in a given path, and apply the equation. The normalizing constant z may be expressed as $$z = \sum_{y'} e^{\Sigma e_i \in y \, s(e_i)},$$

where y' is any particular assignment, and $e_i$. Although this disclosure describes calculating a confidence score in a particular manner, this disclosure contemplates calculating a confidence score in any suitable manner.

In particular embodiments, the social-networking system 160 may assign an entity candidate to one or more of the n-grams based on the calculated confidence scores corresponding to the n-grams. In particular embodiments, the assignment may be based on whether the calculated confidence score for a particular entity candidate is above a threshold score (e.g., 0.70). In particular embodiments, the social-networking system 160 may rank the entity candidates according to the confidence scores calculated for each entity candidate, in descending order. The social-networking system 160 may then select the top n scoring candidates to assign to the one or more n-grams. As an example and not by way of limitation, for the text input, "new york city bus," the social-networking system 160 may calculate confidence scores for entity candidates in the following manner:

| Entity Candidate | Confidence Score | Assigned? (Yes/No) |
| --- | --- | --- |
| New York City | .75 | Yes |
| New York (song by Alicia Keys) | .45 | Yes |
| USS New York City | .05 | No |
| York City | .05 | No |
| City Bus | .05 | No |

In particular embodiments, the social-networking system 160 may identify one or more objects matching the assigned entities and the n-grams from the inputted text (e.g., search query), and send to client system 130 a search-results interface responsive to the search query. The search-results interface may comprise one or more search results that correspond to one or more of the identified objects. As an example and not by way of limitation, if the entity candidate New York City is assigned a confidences score of 0.75 for the search query "new york city bus", the social-networking system 160 may identify one or more objects that match the entity candidate and the n-grams in the query, such as an official page for New York City, or a link to "New York" by Alicia Keys. Although this disclosure describes identifying and sending objects in a particular manner, this disclosure contemplates identifying and sending objects in any suitable manner.

Figure 6:
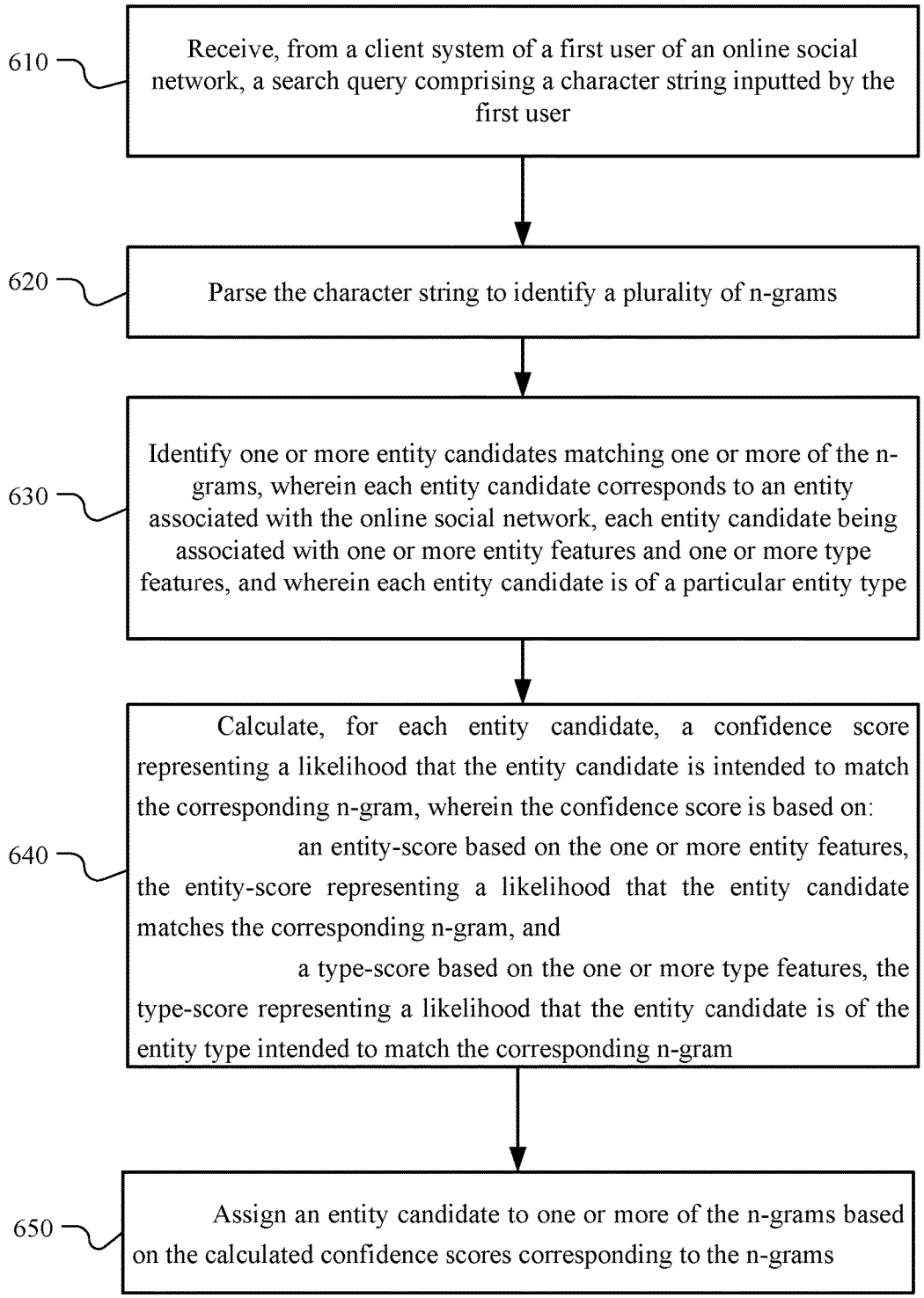
FIG. 6 illustrates an example method for assigning one or more entity candidates to one or more n-grams.

FIG. 6 illustrates an example method 600 for associating text strings within search queries with one or more entities on the social-networking system. The method may begin at step 610, where the social-networking system 160 may receive, from a client system of a first user of an online social network, a search query comprising a character string inputted by the first user. At step 620, the social-networking system 160 may parse the character string to identify a plurality of n-grams. At step 630, the social-networking system 160 may identify one or more entity candidates matching one or more of the n-grams, wherein each entity candidate corresponds to an entity associated with the online social network, each entity candidate being associated with one or more entity features and one or more type features, and wherein each entity candidate is of a particular entity type. At step 640, the social-networking system 160 may calculate, for each entity candidate, a confidence score representing a likelihood that the entity candidate is intended to match the corresponding n-gram, wherein the confidence score is based on: an entity-score based on the one or more entity features, the entity-score representing a likelihood that the entity candidate matches the corresponding n-gram, and a type-score based on the one or more type features, the type-score representing a likelihood that the entity candidate is of the entity type intended to match the corresponding n-gram. At step 650, the social-networking system 160 may assign an entity candidate to one or more of the n-grams based on the calculated confidence scores corresponding to the n-grams. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for associating text strings within search queries with one or more entities on the social-networking system. including the particular steps of the method of FIG. 6, this disclosure contemplates any suitable method for associating text strings within search queries with one or more entities on the social-networking system, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
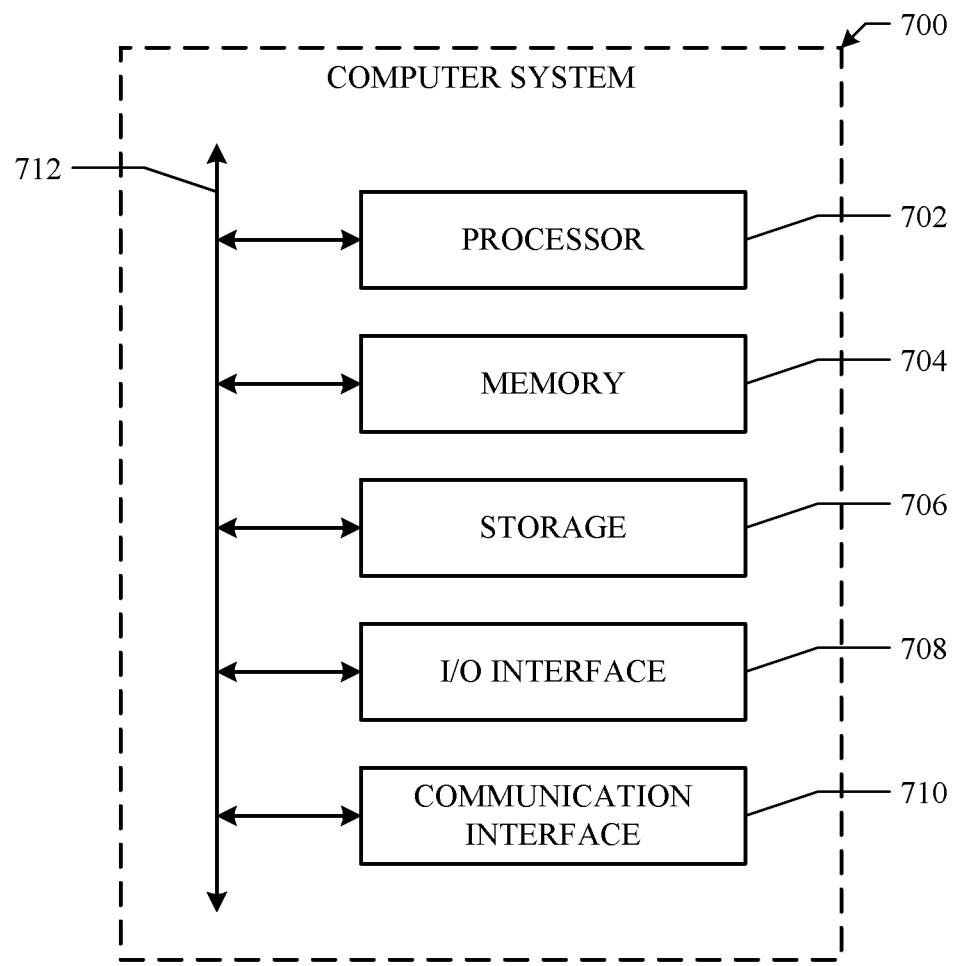
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Embedding Spaces

Figure 8:
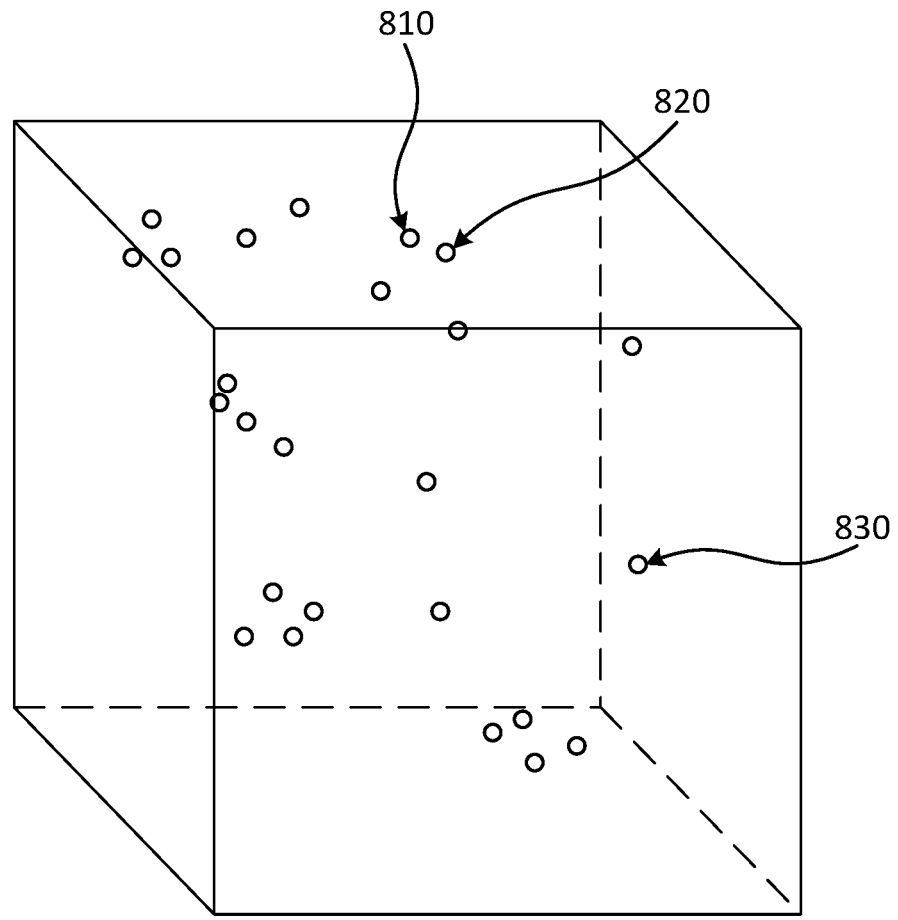
FIG. 8 illustrates an example view of an embedding space.

FIG. 8 illustrates an example view of an embedding space 800. In particular embodiments, n-grams may be represented in a d-dimensional embedding space, where d denotes any suitable number of dimensions. Although the embedding space 800 is illustrated as a three-dimensional space, this is for illustrative purposes only, as the embedding space 800 may be of any suitable dimension. In particular embodiments, an n-gram may be represented in the embedding space 800 as a vector referred to as a term embedding. Each vector may comprise coordinates corresponding to a particular point in the embedding space 800 (i.e., the terminal point of the vector). As an example and not by way of limitation, embeddings 810, 820, and 830 may be represented as points in the embedding space 800, as illustrated in FIG. 8. An n-gram may be mapped to a respective vector representation. As an example and not by way of limitation, n-grams $t_1$ and $t_2$ may be mapped to vectors $\vec{v_1}$ and $\vec{v_1}$ in the embedding space 800, respectively, by applying a function $\pi$ defined by a dictionary, such that $\vec{v_2} = \pi(t_1)$ and $\vec{v_2} = \pi(t_2)$. As another example and not by way of limitation, a dictionary trained to map text to a vector representation may be utilized, or such a dictionary may be itself generated via training. As another example and not by way of limitation, a model, such as word2vec, may be used to map an n-gram to a vector representation in the embedding space 800. In particular embodiments, an n-gram may be mapped to a vector representation in the embedding space 800 by using a deep-leaning model (e.g., a neural network). The deep-learning model may have been trained using a sequence of training data (e.g., a corpus of objects each comprising n-grams). In particular embodiments, objects may be mapped to an embedding in the embedding space 800. An embedding $\pi(e)$ of object e may be based on one or more properties, attributes, or features of the object, relationships of the object with other objects, or any other suitable information associated with the object. As an example and not by way of limitation, an embedding $\pi(e)$ of object e may be based on one or more n-grams associated with object e. In particular embodiments, an object may be mapped to a vector representation in the embedding space 800 by using a deep-learning model. In particular embodiments, the social-networking system 160 may utilize one or more systems, components, elements, functions, methods, operations, or steps disclosed in U.S. patent application Ser. No. 14/949,436, filed 23 Nov. 2015, which is incorporated by reference. Although this disclosure describes representing an n-gram or an object in an embedding space in a particular manner, this disclosure contemplates representing an n-gram or an object in an embedding space in any suitable manner.

In particular embodiments, the social-networking system 160 may calculate a similarity metric of embeddings in embedding space 800. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \cdot \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two embeddings may represent how similar the two objects corresponding to the two embeddings, respectively, are to one another, as measured by the distance between the two embeddings in the embedding space 800. As an example and not by way of limitation, embedding 810 and embedding 820 may correspond to objects that are more similar to one another than the objects corresponding to embedding 810 and embedding 830, based on the distance between the respective embeddings.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
receiving, from a client system of a first user of an online social network, a search query comprising a character string inputted by the first user;
parsing the character string to identify a plurality of n-grams;
identifying one or more entity candidates matching one or more of the n-grams, wherein each entity candidate corresponds to an entity associated with the online social network, each entity candidate being associated with one or more entity features and one or more type features, and wherein each entity candidate is of a particular entity type;
calculating, for each entity candidate, a confidence score representing a likelihood that the entity candidate is intended to match the corresponding n-gram, wherein the confidence score is based on:
an entity-score based on the one or more entity features, the entity-score representing a likelihood that the entity candidate matches the corresponding n-gram, and
a type-score based on the one or more type features, the type-score representing a likelihood that the entity type associated with the entity candidate matches an entity type the first user intended to reference with the corresponding n-gram;
assigning an entity candidate to one or more of the n-grams based on the calculated confidence scores corresponding to the n-grams; and
sending, to the client system for display, instructions for presenting a search-results interface responsive to the search query, wherein the search-results interface comprises one or more search results corresponding to one or more identified objects, respectively, matching the assigned entities and the n-grams from the query.

2. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of entities associated with the online social network, respectively.

3. The method of claim 2, wherein one or more of the entity candidates are sourced from the social graph, and wherein one or more of the entity candidates correspond to one or more of the second nodes, respectively.

4. The method of claim 1, further comprising:
identifying the one or more objects matching the assigned entities and the n-grams from the query.

5. The method of claim 1, wherein the confidence score is calculated using a segmental conditional random field (CRF) model.

6. The method of claim 1, wherein the entity candidate is either a social-graph entity or a keyword.

7. The method of claim 1, wherein the entity features comprise one or more of:
a number of likes associated with the entity candidate,
a number of in-links associated with the entity candidate in a third-party database, or an affinity coefficient between the entity candidate and the first user.

8. The method of claim 1, wherein the type features comprise one or more of:
one or more n-grams comprised in the entity candidate, or
one or more n-grams surrounding the entity candidate in the search query.

9. The method of claim 1, wherein the entity candidates are sourced from a third party database.

10. The method of claim 1, wherein the confidence score for a particular entity candidate is $s(e_k)$, wherein:
$s(e_k)=\Sigma_i w_i^e f_i^e(e_k, \text{text})+\Sigma_j g_j^t f_j^t(\text{type}(e_k), \text{text})$, and wherein
$e_k$ is the particular entity candidate;
$f_i^e$ is a particular entity feature associated with the particular entity candidate $e_k$;
$w_i^e$ is an entity weight assigned to the particular entity feature $f_i^e$;
$f_j^t$ is a particular type feature associated with the particular entity candidate $e_k$; and
$g_j^t$ is a type weight assigned to the particular type feature $f_j^t$.

11. The method of claim 1 further comprising calculating a probability that all identified entity candidates will be assigned to the plurality of n-grams, wherein the probability is $$p(y) = \frac{e^{\Sigma_{e_i \in y} s(e_i)}}{z},$$

and wherein:
$e_i$ is a particular entity candidate;
y is a set of all possible assignments; and
z is a normalizing constant that represents a sum of all possible assignments.

12. The method of claim 1, wherein the entity features comprise:
one or more context features associated with the entity candidate, wherein the context features are based on a similarity of an embedding of the n-gram and an embedding of the entity candidate.

13. The method of claim 1, wherein each entity candidate is referenced by an entity forward index that stores the entity features and a canonical ID for each entity candidate.

14. One or more computer-readable non-transitory storage media embodying software that is operable when executed to:
receive, from a client system of a first user of an online social network, a search query comprising a character string inputted by the first user;
parse the character string to identify a plurality of n-grams;
identify one or more entity candidates matching one or more of the n-grams, wherein each entity candidate corresponds to an entity associated with the online social network, each entity candidate being associated with one or more entity features and one or more type features, and wherein each entity candidate is of a particular entity type;
calculate, for each entity candidate, a confidence score representing a likelihood that the entity candidate is intended to match the corresponding n-gram, wherein the confidence score is based on:
an entity-score based on the one or more entity features, the entity-score representing a likelihood that the entity candidate matches the corresponding n-gram, and
a type-score based on the one or more type features, the type-score representing a likelihood that the entity type associated with the entity candidate matches an entity type the first user intended to reference with the corresponding n-gram;
assign an entity candidate to one or more of the n-grams based on the calculated confidence scores corresponding to the n-grams; and
send, to the client system for display, instructions for presenting a search-results interface responsive to the search query, wherein the search-results interface comprises one or more search results corresponding to one or more identified objects, respectively, matching the assigned entities and the n-grams from the query.

15. A system comprising: one or more processors; and a non-transitory memory coupled to the processors comprising instructions executable by the processors, the processors operable when executing the instructions to:
receive, from a client system of a first user of an online social network, a search query comprising a character string inputted by the first user;
parse the character string to identify a plurality of n-grams;
identify one or more entity candidates matching one or more of the n-grams, wherein each entity candidate corresponds to an entity associated with the online social network, each entity candidate being associated with one or more entity features and one or more type features, and wherein each entity candidate is of a particular entity type;
calculate, for each entity candidate, a confidence score representing a likelihood that the entity candidate is intended to match the corresponding n-gram, wherein the confidence score is based on:
an entity-score based on the one or more entity features, the entity-score representing a likelihood that the entity candidate matches the corresponding n-gram, and
a type-score based on the one or more type features, the type-score representing a likelihood that the entity type associated with the entity candidate matches an entity type the first user intended to reference with the corresponding n-gram;
assign an entity candidate to one or more of the n-grams based on the calculated confidence scores corresponding to the n-grams; and
send, to the client system for display, instructions for presenting a search-results interface responsive to the search query, wherein the search-results interface comprises one or more search results corresponding to one or more identified objects, respectively, matching the assigned entities and the n-grams from the query.

* * * * *